US010841852B2

(12) United States Patent
Holleczek et al.

(10) Patent No.: US 10,841,852 B2
(45) Date of Patent: Nov. 17, 2020

(54) TRANSPORTATION NETWORK MONITORING USING CELLULAR RADIO METADATA

(71) Applicant: Dataspark Pte, Ltd., Singapore (SG)

(72) Inventors: Thomas Martin Holleczek, Singapore (SG); Deepak Jayakumaran, Singapore (SG); Amy Xuemei Shi-Nash, Singapore (SG)

(73) Assignee: DataSpark, Pte. Ltd., Singapore (SG)

( * ) Notice: Subject to any disclaimer, the term of this patent is extended or adjusted under 35 U.S.C. 154(b) by 0 days.

(21) Appl. No.: 14/963,289

(22) Filed: Dec. 9, 2015

(65) Prior Publication Data

US 2017/0171720 A1    Jun. 15, 2017

(51) Int. Cl.
| | |
|---|---|
| *H04W 36/08* | (2009.01) |
| *H04W 4/029* | (2018.01) |
| *H04W 4/42* | (2018.01) |
| *H04W 8/08* | (2009.01) |
| *H04W 36/22* | (2009.01) |

(52) U.S. Cl.
CPC ........... *H04W 36/22* (2013.01); *H04W 4/029* (2018.02); *H04W 4/42* (2018.02); *H04W 8/08* (2013.01); *H04W 36/08* (2013.01)

(58) Field of Classification Search
CPC ... H04W 36/32; H04W 4/046; H04W 84/005; H04W 4/02; H04W 4/027; H04W 4/08; H04W 88/00; G08G 1/0112; G08G 1/0116; G08G 1/012; G08G 1/0129; G08G 1/052
See application file for complete search history.

(56) References Cited

U.S. PATENT DOCUMENTS

| | | | |
|---|---|---|---|
| 3,057,726 | A | 10/1962 | Teignmouth |
| 3,102,813 | A | 9/1963 | Teignmouth et al. |
| 3,984,326 | A | 10/1976 | Bendel |
| 4,552,060 | A | 11/1985 | Redl et al. |
| 5,906,151 | A | 5/1999 | Firestone et al. |

(Continued)

FOREIGN PATENT DOCUMENTS

| | | |
|---|---|---|
| WO | 1997016892 A1 | 5/1997 |
| WO | 1998035511 A2 | 8/1998 |

(Continued)

*Primary Examiner* — George Eng
*Assistant Examiner* — Umair Ahsan
(74) *Attorney, Agent, or Firm* — Krajec Patent Offices, LLC; Russell Krajec

(57) ABSTRACT

A transportation network monitoring system may use handoff metadata from cellular telephone and other communication networks to monitor train movement, traffic density, and traffic movement within the transportation network. Many communication technologies have handoff protocols that change a mobile device's connection from one base station to another. In a transportation network, such as a subway, a subway train may have several hundreds of riders, each of which may have a mobile device. As the train travels along the track, the handoff characteristics of those mobile devices may be analyzed to determine several characteristics of the transportation network, including the real time presence and speed of the train, as well as estimating the number of passengers and even the number of available seats on the train.

17 Claims, 6 Drawing Sheets

(56) References Cited

U.S. PATENT DOCUMENTS

| | | | |
|---|---|---|---|
| 6,744,383 B1* | 6/2004 | Alfred | G07B 15/063 340/988 |
| 6,882,930 B2 | 4/2005 | Trayford et al. | |
| 7,099,290 B2 | 8/2006 | Needham et al. | |
| 7,161,497 B2 | 1/2007 | Gueziec | |
| 7,221,287 B2 | 5/2007 | Gueziec et al. | |
| 7,532,604 B2 | 5/2009 | Eglin | |
| 7,765,176 B2 | 7/2010 | Simmons et al. | |
| 7,852,808 B2 | 12/2010 | Wang | |
| 8,046,319 B2 | 10/2011 | Satir et al. | |
| 8,214,883 B2 | 7/2012 | Obasanjo et al. | |
| 8,280,309 B2 | 10/2012 | Monk | |
| 8,331,936 B2* | 12/2012 | Alonso-Rubio | H04W 36/385 370/331 |
| 8,386,495 B1 | 2/2013 | Sandler et al. | |
| 8,423,494 B2 | 4/2013 | Barrett et al. | |
| 8,446,842 B2 | 5/2013 | Cao et al. | |
| 8,478,512 B2 | 7/2013 | Nortrup | |
| 8,583,659 B1 | 11/2013 | Alexandrescu et al. | |
| 8,639,756 B2 | 1/2014 | Boström et al. | |
| 8,666,643 B2 | 3/2014 | McBride et al. | |
| 8,693,458 B2 | 4/2014 | Smartt et al. | |
| 8,725,796 B2 | 5/2014 | Serena | |
| 8,731,835 B2 | 5/2014 | Chidlovskii et al. | |
| 8,739,016 B1 | 5/2014 | Goldman et al. | |
| 8,799,461 B2 | 8/2014 | Herz et al. | |
| 8,805,605 B2 | 8/2014 | Cooper et al. | |
| 8,819,009 B2 | 8/2014 | Wana et al. | |
| 8,825,350 B1* | 9/2014 | Robinson | G08G 1/0116 340/909 |
| 8,849,823 B2 | 9/2014 | Gotz et al. | |
| 8,867,392 B2 | 10/2014 | Yin | |
| 8,868,340 B1 | 10/2014 | Rinckes et al. | |
| 8,938,500 B1 | 1/2015 | Acharya | |
| 8,958,396 B2 | 2/2015 | Ishihara | |
| 9,008,933 B2 | 4/2015 | Cooper et al. | |
| 9,141,656 B1 | 9/2015 | Lopyrev et al. | |
| 9,165,304 B2 | 10/2015 | Weiss et al. | |
| 9,195,722 B1 | 11/2015 | Liu et al. | |
| 9,196,157 B2* | 11/2015 | Hardin | H04W 4/02 |
| 9,494,694 B1 | 11/2016 | Dong et al. | |
| 9,589,303 B2 | 3/2017 | Belov et al. | |
| 9,754,485 B2 | 9/2017 | Holleczek et al. | |
| 2004/0030670 A1 | 2/2004 | Barton | |
| 2004/0058678 A1* | 3/2004 | deTorbal | H04W 36/32 455/437 |
| 2005/0114383 A1 | 5/2005 | Beringer et al. | |
| 2006/0074545 A1* | 4/2006 | Kim | G08G 1/123 701/117 |
| 2007/0088490 A1 | 4/2007 | Sutardja | |
| 2007/0208497 A1 | 9/2007 | Downs et al. | |
| 2008/0004789 A1 | 1/2008 | Horvitz et al. | |
| 2008/0188242 A1 | 8/2008 | Carlson et al. | |
| 2009/0216704 A1 | 8/2009 | Zheng et al. | |
| 2010/0007552 A1 | 1/2010 | Oda et al. | |
| 2011/0099046 A1 | 4/2011 | Weiss et al. | |
| 2011/0099047 A1 | 4/2011 | Weiss et al. | |
| 2011/0099048 A1 | 4/2011 | Weiss et al. | |
| 2011/0145262 A1 | 6/2011 | Jamjoom et al. | |
| 2011/0176523 A1 | 7/2011 | Huang et al. | |
| 2011/0310733 A1 | 12/2011 | Tzamaloukas et al. | |
| 2012/0096002 A1 | 4/2012 | Sheehan et al. | |
| 2012/0221231 A1 | 8/2012 | Nagata et al. | |
| 2012/0226522 A1 | 9/2012 | Weiss et al. | |
| 2012/0245881 A1* | 9/2012 | Takaoka | B61L 25/025 702/128 |
| 2012/0266081 A1 | 10/2012 | Kao | |
| 2012/0296885 A1 | 11/2012 | Gontmakher et al. | |
| 2013/0059607 A1 | 3/2013 | Herz et al. | |
| 2013/0066548 A1 | 3/2013 | Gruen et al. | |
| 2013/0073473 A1 | 3/2013 | Heath | |
| 2013/0085659 A1 | 4/2013 | Bekaert | |
| 2013/0103290 A1 | 4/2013 | Hardin et al. | |
| 2013/0170484 A1 | 7/2013 | Kang et al. | |
| 2013/0173633 A1 | 7/2013 | Piepgrass et al. | |
| 2013/0185189 A1 | 7/2013 | Stewart | |
| 2013/0191325 A1 | 7/2013 | Hatami-Hanza | |
| 2013/0198188 A1 | 8/2013 | Huang et al. | |
| 2013/0204525 A1 | 8/2013 | Pfeifle | |
| 2013/0211706 A1* | 8/2013 | MacNaughtan | G08G 1/0112 701/410 |
| 2013/0260791 A1 | 10/2013 | Malinovskiy et al. | |
| 2014/0012498 A1 | 1/2014 | Gustafson | |
| 2014/0058913 A1 | 2/2014 | Hinesley et al. | |
| 2014/0088865 A1 | 3/2014 | Thies et al. | |
| 2014/0108308 A1 | 4/2014 | Stout et al. | |
| 2014/0122043 A1 | 5/2014 | Bellamy et al. | |
| 2014/0149514 A1 | 5/2014 | Ryan et al. | |
| 2014/0164390 A1 | 6/2014 | Hampapur et al. | |
| 2014/0189524 A1 | 7/2014 | Murarka et al. | |
| 2014/0189530 A1 | 7/2014 | Anand et al. | |
| 2014/0200805 A1 | 7/2014 | Modica et al. | |
| 2014/0222321 A1 | 8/2014 | Petty et al. | |
| 2014/0244149 A1 | 8/2014 | Relyea et al. | |
| 2014/0244752 A1 | 8/2014 | Tseng | |
| 2014/0330548 A1 | 11/2014 | Appel et al. | |
| 2014/0330819 A1 | 11/2014 | Raina et al. | |
| 2015/0006247 A1 | 1/2015 | Batra et al. | |
| 2015/0055627 A1 | 2/2015 | Robbins et al. | |
| 2015/0065159 A1 | 3/2015 | Alpert et al. | |
| 2015/0148068 A1 | 5/2015 | Planas et al. | |
| 2015/0278375 A1 | 10/2015 | Kim et al. | |
| 2015/0285651 A1 | 10/2015 | Cerecke et al. | |
| 2015/0285656 A1 | 10/2015 | Verheyen et al. | |
| 2015/0350890 A1 | 12/2015 | Arunkumar et al. | |
| 2015/0354973 A1 | 12/2015 | Wang et al. | |
| 2016/0021152 A1 | 1/2016 | Maguire et al. | |
| 2016/0078365 A1 | 3/2016 | Baumard | |
| 2016/0327397 A1 | 11/2016 | Cordova et al. | |
| 2016/0371973 A1 | 12/2016 | Holleczek et al. | |
| 2017/0039602 A1 | 2/2017 | Shi-Nash et al. | |
| 2017/0171720 A1 | 6/2017 | Holleczek et al. | |
| 2017/0195854 A1 | 7/2017 | Shi-Nash et al. | |
| 2017/0212945 A1 | 7/2017 | Shankar et al. | |
| 2017/0262653 A1 | 9/2017 | Dang et al. | |
| 2017/0277767 A1 | 9/2017 | Dang et al. | |
| 2017/0277907 A1 | 9/2017 | Dang et al. | |

FOREIGN PATENT DOCUMENTS

| | | |
|---|---|---|
| WO | 2011101983 A1 | 8/2011 |
| WO | 2013182075 A1 | 12/2013 |

* cited by examiner

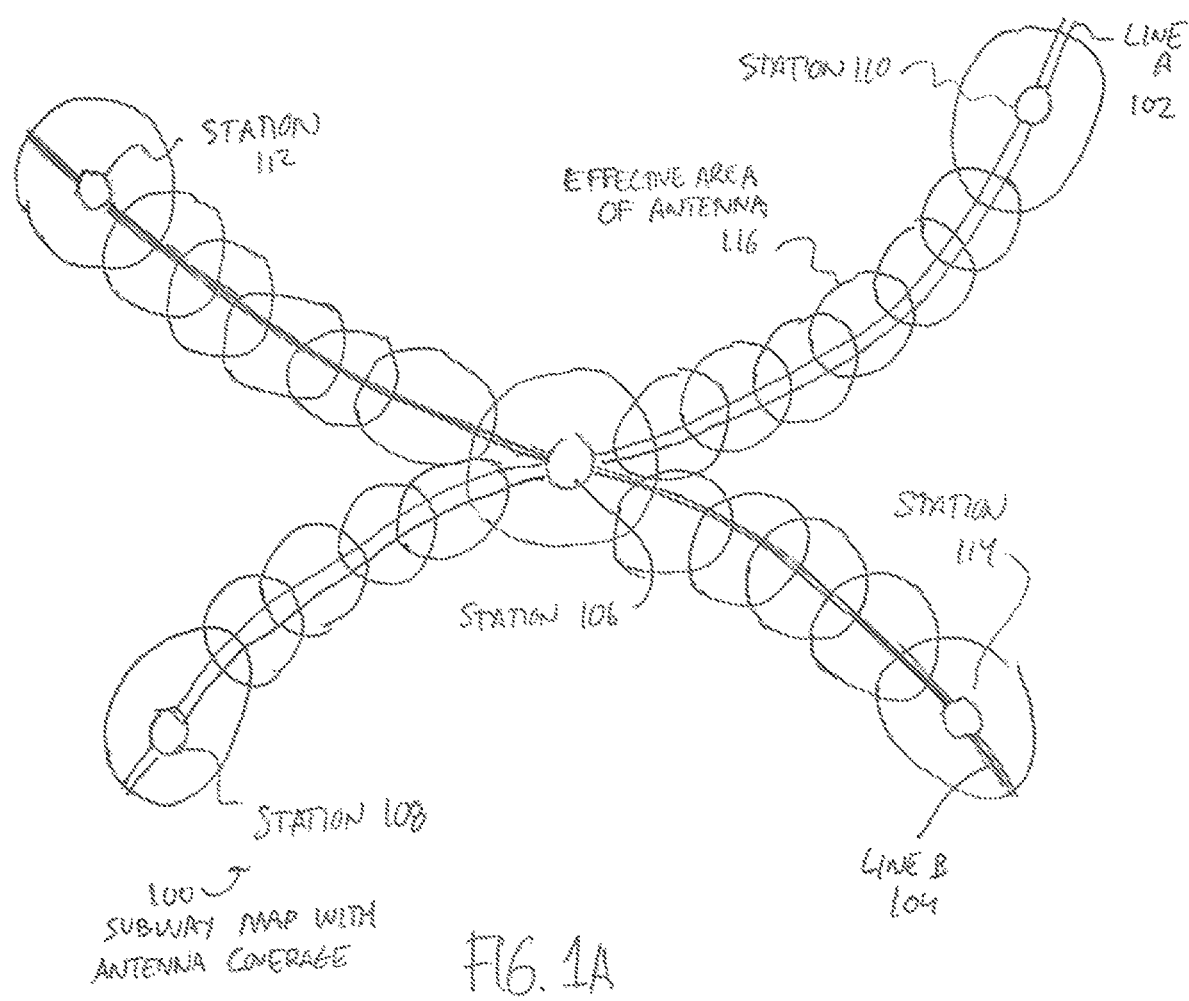

400 HISTORICAL ANALYSIS AND TRAINING DATA

500 REAL TIME DATA ANALYSIS

TRANSPORTATION NETWORK MONITORING USING CELLULAR RADIO METADATA

BACKGROUND

Modern subway systems and other transportation networks often do not have very good monitoring systems. Many monitoring systems may use technologies developed at the dawn of the railroad industry to ensure that two trains may not occupy the same track, and such systems are generally aimed at preventing collisions. However, such systems may not provide accurate and real time data for actual train movements.

SUMMARY

A transportation network monitoring system may use handoff metadata from cellular telephone and other communication networks to monitor train movement, traffic density, and traffic movement within the transportation network. Many communication technologies have handoff protocols that change a mobile device's connection from one base station to another. In a transportation network, such as a subway, a subway train may have several hundreds of riders, each of which may have a mobile device. As the train travels along the track, the handoff characteristics of those mobile devices may be analyzed to determine several characteristics of the transportation network, including the real time presence and speed of the train, as well as estimating the number of passengers and even the number of available seats on the train.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 1A is a diagram illustration of an embodiment showing a transportation map with various antenna or cell locations.

DETAILED DESCRIPTION

Figure 1B:
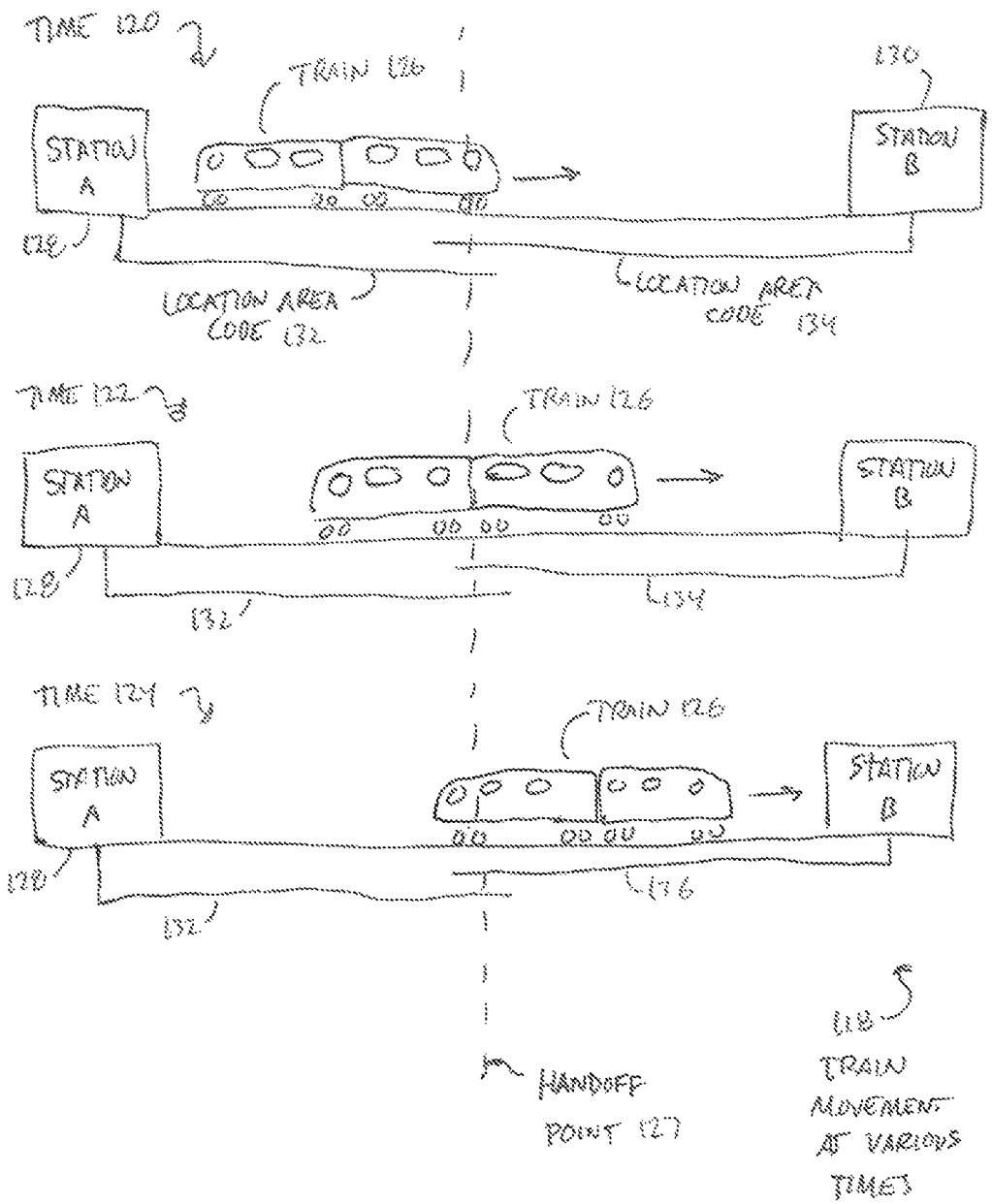
FIG. 1B is a diagram illustration of an embodiment showing a train traveling towards an antenna and crossing into the antenna's working range.

Transportation Network Monitoring Using Cellular Radio Metadata

A transportation network may be monitored using handoff information for radios that may be carried by riders on a train, airplane, ferry, bus, or other transit mechanism. Handoffs may be made as the transportation vehicle comes into or leaves the reception zone of a fixed base station, and analyses of the handoffs may be used to generate operational data for the transportation network.

For example, a subway train may enter a station and come into the operational zone of a cellular base station located in the station. The cellular telephones carried by passengers may make handoffs to the base station as the train arrives. An arrival event of the train may be identified by the handoffs, and the number of passengers may be estimated based on the number of handoffs. Further analyses may include estimating the speed of the train by the length of time from the first handoff to the last one, estimating the loading of each car of the train based on the distribution of handoffs over time, and estimating the number of available seats on the train based on the loading of each car.

A communications network may have multiple fixed base stations located throughout a transportation network. Each of the base stations may have a known location, and in many cases, several base stations may be grouped together and given the same area code. A communications network monitoring system may examine the handoff patterns between area codes to identify movement of people between area codes. When large groups of people are observed moving from one area code to the next, the motion of a train or other transportation vehicle may be implied.

The communications network may be any type of communications network where mobile devices connect to a series of fixed base stations. In some cases, such as GSM and other cellular telephone protocols, the communications network may proactively manage and facilitate handoffs between base stations. In other cases, such as WiFi or various IEEE 802.11 protocols, a device may manage the connections and may automatically attempt to connect to a base station or access point when the device comes into range of the access point.

A system for managing transportation networks may identify patterns of expected behavior of the network and may be able to identify anomalies or problems when the transportation network may not be behaving as expected. For example, a system may use historical data to learn patterns of train arrivals and departures, then may compare real time data to the historical patterns to determine when a train may be running late or some other problem may be occurring. Such anomalies may be detected in real time using mobile device connection patterns faster and more accurately than some conventional transportation network monitoring systems.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1A is an illustration showing an example embodiment 100 illustrating a subway map with antenna coverage. Embodiment 100 is a simplified example of a map that may be used to highlight how vehicle movements may be identified and measured using cellular radio handoffs.

In the example of a train system, a Line A 102 and Line B 104 may be illustrated as crossing at station 106. Line A 102 may include station 108, station 106, and station 110, while Line B 104 may include station 112, station 106, and station 114. Along each line, an effective area of an antenna 116 may be illustrated.

In many cases, radio communications may be provided through a distributed antenna system (DAS) or other mechanism whereby radio coverage may be provided throughout a large system. In an underground subway system, for example, radio antennas may be distributed along the length of a subway tunnel.

The entry and exit of trains along each of the effective areas of an antenna 116 may be points where the presence, speed, and passenger loading of a vehicle may be monitored. By using handoff information from cellular or other radio networks, an accurate picture of vehicle movements may be gathered without having other sensors, video monitors, detectors, or other separate data gathering systems in place. In some cases, a system that may analyze handoff information may supplement or even replace conventional train monitoring systems.

By analyzing the handoffs between mobile radios and the antenna 116, many data points about a train may be estimated. Within a train, there may be many riders, and many of those riders may have cellular telephones, tablet computers, slate computers, laptop computers, smart watches, wearable fitness trackers, emergency alert devices, or any of a host of portable electronic devices, many of which contain radios that may access external networks. The networks may be traditional cellular telephony, but may also include data networks such as IEEE 802.11 networks (WiFi), IEEE 802.16 (WiMAX), or any type of voice, data, or combination of voice and data radio systems.

As a train enters or exits the operating range of an antenna 116, rider's personal electronic devices may perform a handoff to establish connection to a network through the antenna 116. The presence of a large group of handoffs in a short period of time may indicate that a train has passed into range of the antenna 116, which may register the presence of the train. Further, by knowing the length of the train and comparing the first and last handoffs, the speed of the train may be estimated. The analysis of the density of handoffs within the cluster of handoffs may also give an estimate of the number of riders and the distribution of those riders across the length of the train.

In this example, analyses of handoff information may be performed as a vehicle enters or leaves an antenna's working range. In some cases, vehicle speed may be measured by calculating the time and distance from when a vehicle entered and exited an antenna's working range.

Vehicle movements may be measured in real time to provide input to a system-wide monitoring function, where transportation managers may identify and manage problems within the system. Such movements may also be made available to the general public to provide alerts and status of traffic congestions.

The analyses of handoff information may be performed without revealing any personally identifiable information (PII) about any person in the train. The handoff information may be metadata gathered from managing a cellular or other network where base stations or antennas may be distributed around a vehicle's path.

In the examples of embodiment 100, the illustration is made of a subway train, although the same techniques may be applied to any type of vehicle in which riders or passengers may carry mobile devices that may have radios. The vehicles may include airplanes, ferries, busses, cars, or any other mode of transportation.

FIG. 1B is an illustration showing three points of time 120, 122, and 124, where a train 126 may be crossing a handoff point 127. The handoff point 127 may be the area of overlap between location area codes 132 and 134.

The location area codes 132 and 134 may represent antennas or sets of antennas that may manage cellular radio communications. At the handoff point 127, radios may switch between location area codes 132 and 134.

The train 126 is illustrated as entering the handoff point 127 at time 120, then approximately midpoint through the handoff point 127 at time 122, and leaving the handoff point 127 at time 124.

Figure 1C:
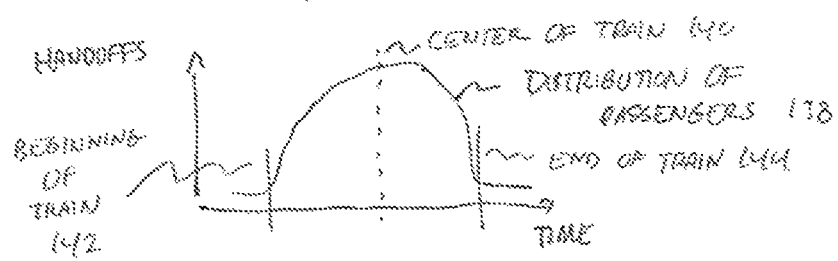
FIG. 1C is a diagram illustration of an embodiment showing a distribution of passengers within a train.

FIG. 1C is a graph showing the number of handoffs received per unit time and can be interpreted as a distribution of passengers 138. This graph may be interpreted by determining the center of the train 140 by finding the midpoint between the beginning of the train 142 and the end of the train 144.

When the length of the train is known, the time between the beginning of the train 142 and end of the train 144 may be used to calculate the train speed.

The distribution of passengers 138 may be used to estimate the number and distribution of passengers throughout the train. In the example, there appears to be more passengers in the rear of the train than in the front.

Figure 2:
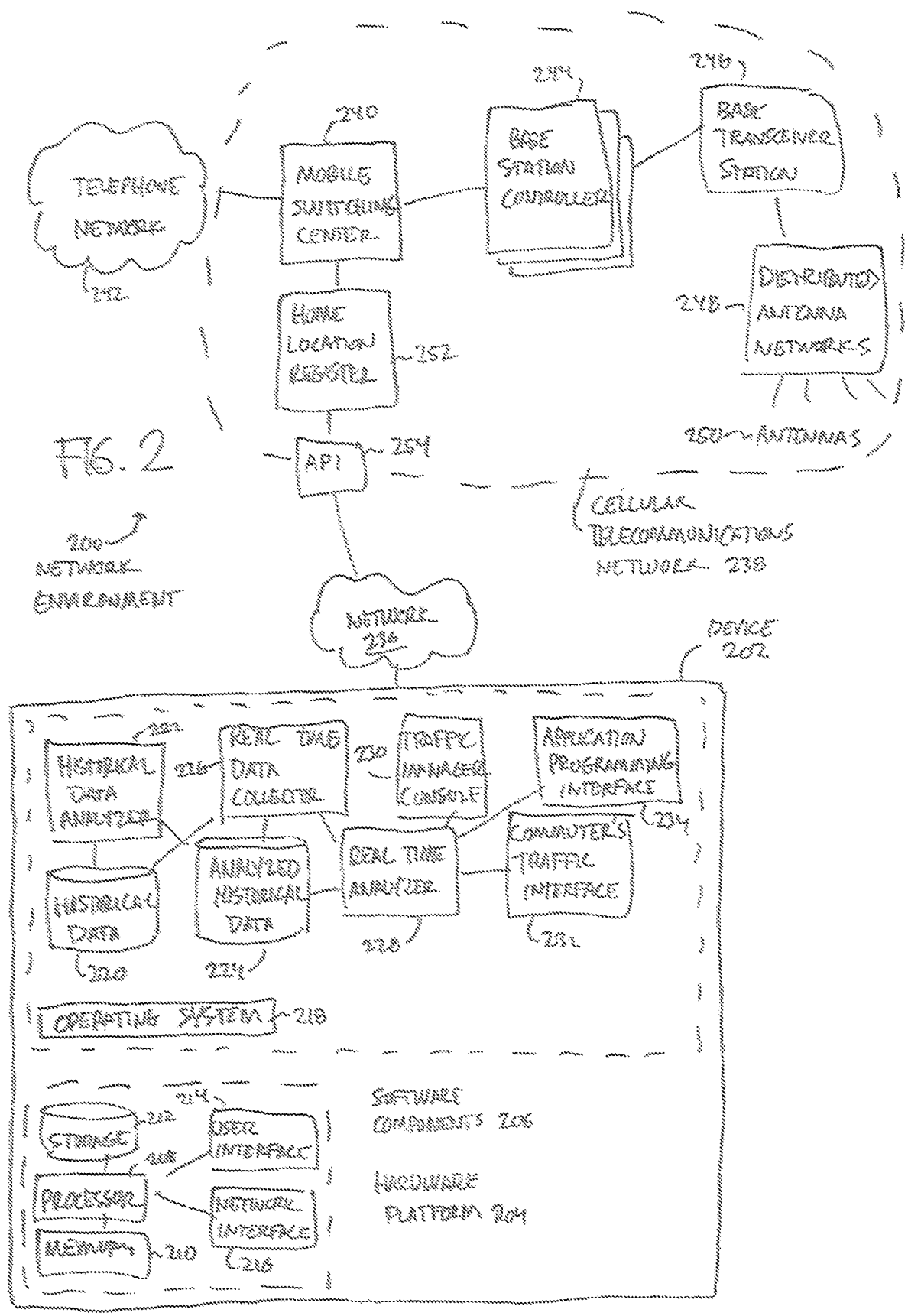
FIG. 2 is a diagram illustration of an embodiment showing a network environment an analyzer for handoff data.

FIG. 2 is a diagram of an embodiment 200 showing components that may analyze handoff information to determine vehicle movements and other data points. The example of embodiment 200 is merely one topology that may be used to gather and analyze handoff information.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A set of historical data 220 may be analyzed by a historical data analyzer 222 to generate analyzed historical data 224. The analysis may involve several different factors, including identifying vehicle types, capacities, and operational patterns, as well as determining baseline schedules for day of the week, hour of the day, and other factors.

The analysis may include identifying vehicle behaviors from the volume of handoffs. For example, a subway platform may have a large number of handoffs from people who enter and exit the station as pedestrians. When a train arrives or leaves the station, the number of handoffs may spike, as each of the train's passengers may create a handoff. The handoffs from an incoming or outbound train may register as a relatively large number of handoffs within a very short period of time. This spike in handoffs may be separated from the relatively random handoffs that may occur when people enter the train station.

Correspondingly, passengers who disembark a train at a particular train station may generally leave the train station as a group and cause handoffs as they leave the area. This group of people may also be identified from the handoff data as creating a surge in handoffs, but one that may be less pronounced and more spread out than the handoffs created by a fully loaded train, for example.

A real time data collector 226 may gather handoff data in real time or near-real time. The data may be analyzed by a real time data analyzer 228. The analyzed data may be made available to a traffic manager console 230, a commuter's traffic interface 232, as well as an application programming interface 234.

The term "real time" is meant to describe data that are current and recently obtained. The term "near-real time" is meant to describe similar data that may have a time delay. The time delay may be any delay from milliseconds to minutes, hours, or longer. Throughout this specification, the terms "real time" and "near-real time" are used interchangeably to refer to systems that have current or nearly current data.

The real time analysis of the data may identify traffic movements within a transit system as the traffic occurs. The analysis may also compare the events occurring in real time to historical events. The comparison may identify whether traffic is higher or lower than normal, whether vehicles are operating on time, late, or ahead of schedule, whether problems may exist within the transit system, and other factors.

A traffic manager console 230 may be a user interface where a transit authority or other traffic manager may monitor how a transit system may be operating. The traffic manager console 230 may display many additional data points about the operation of the vehicles in the system, in addition to data gathered from handoff analyses.

A commuter's traffic interface 232 may be any type of notification system that may be used by people who may be traveling within the transit system. In some cases, the system may be a website, application, or other computer interface through which a user may view commute times, congestion levels, or other information about the transit system. Similar information may be available through an application programming interface 234, which may supply data, maps, or other information that may be processed by other computers, such as a mobile device with an application that may gather traffic information.

A network 236 may connect the device 202 to various other devices, including a cellular telecommunications network 238. The example of a cellular telecommunications network 238 may be one type of radio network that may identify and collect handoff information. Other radio networks may have the capability of collecting similar handoff information which may be processed by the various analyzers illustrated as being part of device 202.

A mobile switching center 240 may be a connection point for a cellular telecommunications network 238 and the wider telephone network 242. The telephone network 242 may be a packet switched telephone network (PSTN) or other communications network. The mobile switching center 240 may communicate with many base station controllers 244, each of which may control several base transceiver stations 246. Some base transceiver stations 246 may have distributed antenna systems 248 of which are attached various antennas.

A home location register 252 may be a device or service that may track users within the cellular network. The tracking may be done by identifying when a user connects with the network and may update the user's location with each handoff to another cell within the network. The home location register 252 may provide handoff information through an application programming interface 254.

The handoff information may include the antenna or base station designation, a time stamp, and whether the handoff was incoming or outgoing with respect to the location. In some cases, a physical location may be given for the location of the handoff, but in other cases, an identifier may be an internal identifier. In such cases, a physical map may be developed that correlate the internal identifier with a physical location.

Figure 3:
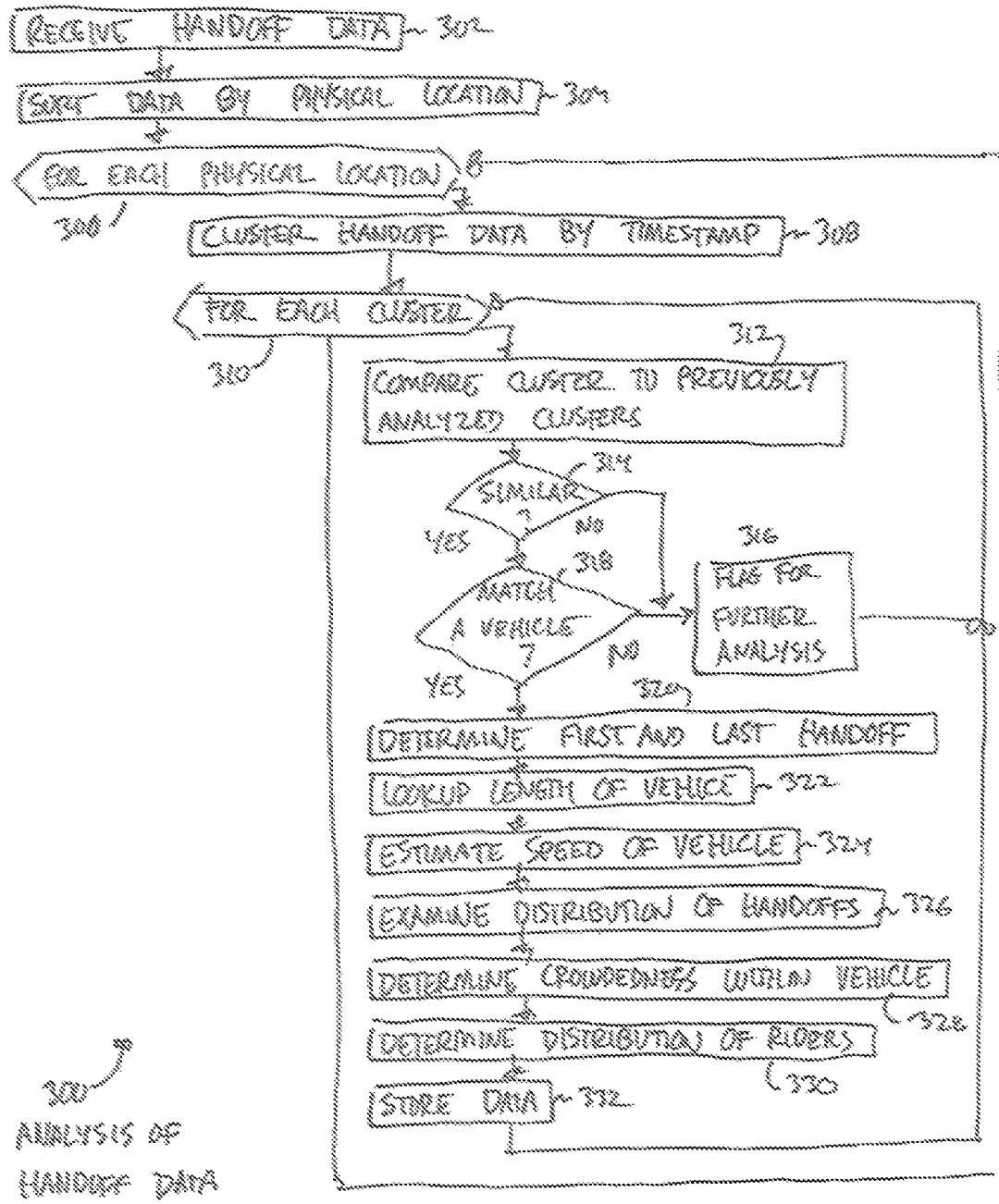
FIG. 3 is a flowchart illustration of an embodiment showing a method for analyzing handoff data.

FIG. 3 is a flowchart illustration of an embodiment 300 showing a method of analyzing handoff data. Embodiment 300 is a simplified example of a sequence for analyzing a set of handoff data, which may be historical or real time data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 300 is one example of how handoff data may be analyzed. The data may be analyzed using clustering analysis to identify clusters of data, then compare those clusters to vehicle movements or other events that have previously been identified. When a vehicle movement has been identified, various other data may be inferred or estimated.

Handoff data may be received in block 302. The data may be sorted by physical location in block 304, and for each physical location in block 306, the data may be further clustered by timestamp in block 308.

The clustering analysis of block 308 may identify events within the data that may be indicated by a high number of similar handoffs happening very close to each other. One such event may be the transitioning of a train from one base station to another, where the passenger's devices may nearly simultaneously handoff from one base station to another.

For each identified cluster in block 310, a cluster may be compared to previously classified clusters in block 312. When the cluster may not be similar to any of the previously classified clusters in block 314, the cluster may be flagged for further analysis in block 316. Similarly, if the cluster is similar to previously classified clusters in block 314 but may not match a known vehicle type in block 318, the cluster may be flagged for further analysis in block 316. The previously classified clusters may have been manually classified by a data scientist or other analyst and tagged with vehicle type, for example, or other tags.

The first and last handoff of a cluster may be identified in block 320. After looking up the length of the vehicle in block 322, an estimated speed of the vehicle may be determined in block 324. The estimated speed may be calculated after assuming that the first and last handoffs associated with the vehicle may represent passengers at either end of the vehicle, so that the vehicle speed may be calculated by the distance between the passengers and the time to travel that distance. Such a calculation may not be precise based on many factors, but it may be sufficient in many cases to verify vehicle movements within a transit system.

The distribution of handoffs within the cluster may be examined in block 326. Based on the distribution of handoffs, an estimate about the crowdedness of the vehicle may be made in block 328.

In many cases, a jurisdiction may have multiple wireless carriers and multiple types of wireless connections, so the number of handoffs within a cluster may not be a total count of devices within a vehicle, but may be a sample. The number of handoffs within a cluster may be used with the percentage of consumers who subscribe to the telecommunication carrier to calculate an estimate of the total number of passengers of a vehicle.

The distribution of handoffs may give an estimate for the number of passengers in different cars of a train, for example. In some cases, certain cars of a train may contain more passengers than others, and such a distribution may mirror the distribution of actual people in block 330.

The data may be stored in block 332 and the process may loop back to analyze additional clusters in block 310.

Figure 4:
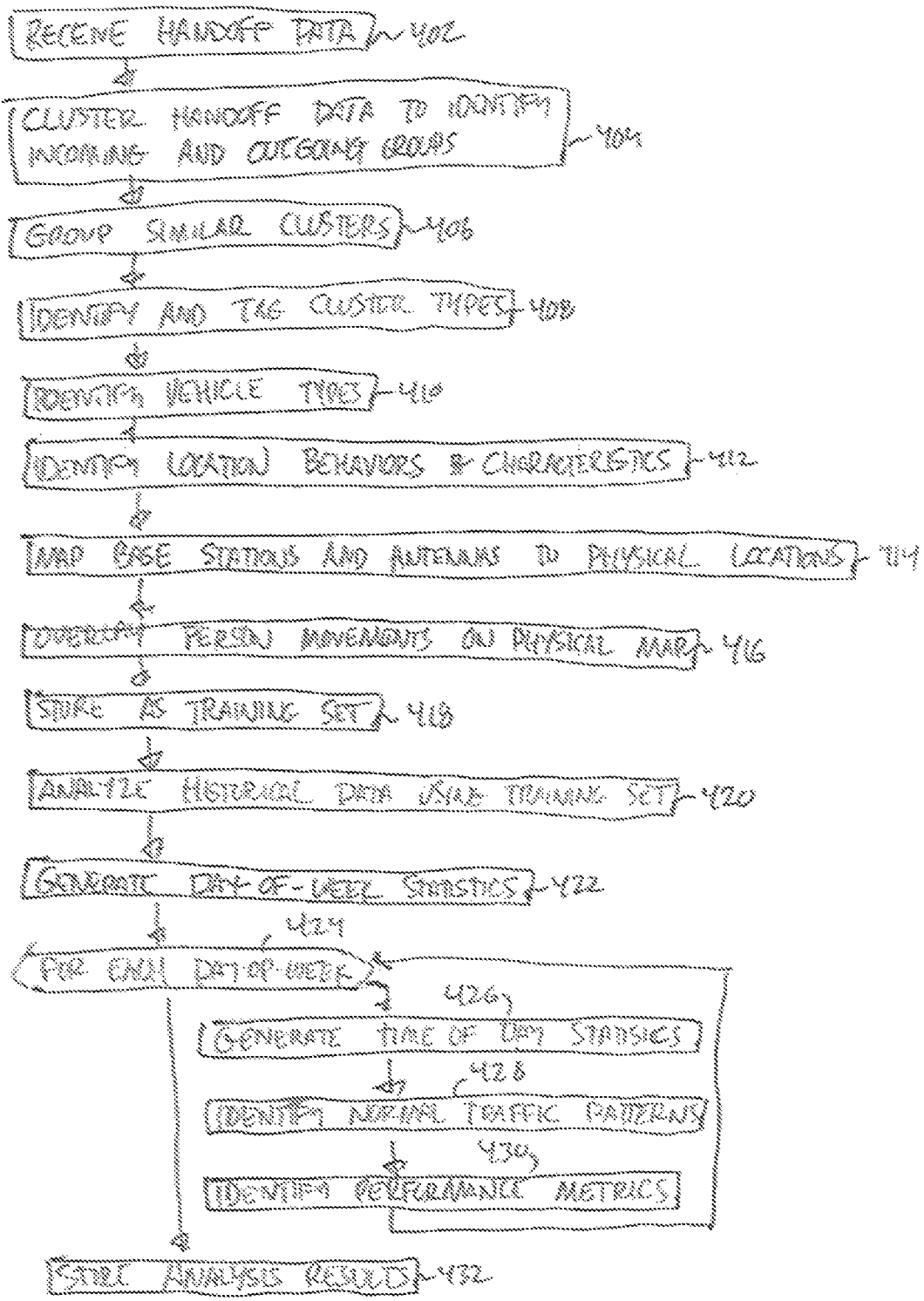
FIG. 4 is a flowchart illustration of an embodiment showing a method for analyzing historical handoff data.

FIG. 4 is a flowchart illustration of an embodiment 400 showing a method of performing historical analysis of handoff data. Embodiment 400 is a simplified example of a sequence for identifying clusters within a sample data set, evaluating characteristics of various locations, and building a set of statistics to which real time data may be compared.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A set of handoff data may be received in block 402. The handoff data may be clustered to identify incoming and outgoing groups of handoffs in block 404.

The clusters may be grouped by similarity in block 406. The cluster types may be identified and tagged in block 408. In many cases, the identification and tagging of initial cluster types may be a manual operation that a data scientist or other analyst may manually analyze and verify. Similarly, the vehicle types associated by a cluster may be identified in block 401, which again may be a manual or human-assisted operation.

Within the handoff data, individual locations and their characteristics may be identified in block 412. In some locations, the data clusters that may indicate a vehicle may be different than in other locations. This can be an artifact of how the antennas may be located and labeled as well as other factors. For example, vehicles that may be slowing to arrive at a station may have handoff patterns that may be different from base stations or antenna locations within a subway tunnel where a train may be moving at high speeds.

The physical locations and their data may be mapped to a physical map in block 416.

The analyzed data may be saved as a training set in block 418, and the training set may be used to analyze a large historical database of handoff data in block 420.

From the analysis of historical data, day of week statistics may be generated in block 422. For each day of the week in block 424, time of day statistics may be generated in block 426. Normal traffic patterns may be generated in block 428, and various performance metrics, such as on time metrics, may be generated in block 430.

The analysis results may be saved in block 432 and may be used to compare real time data. In many cases, the historical statistics may be re-analyzed on a periodic basis and updated.

Figure 5:
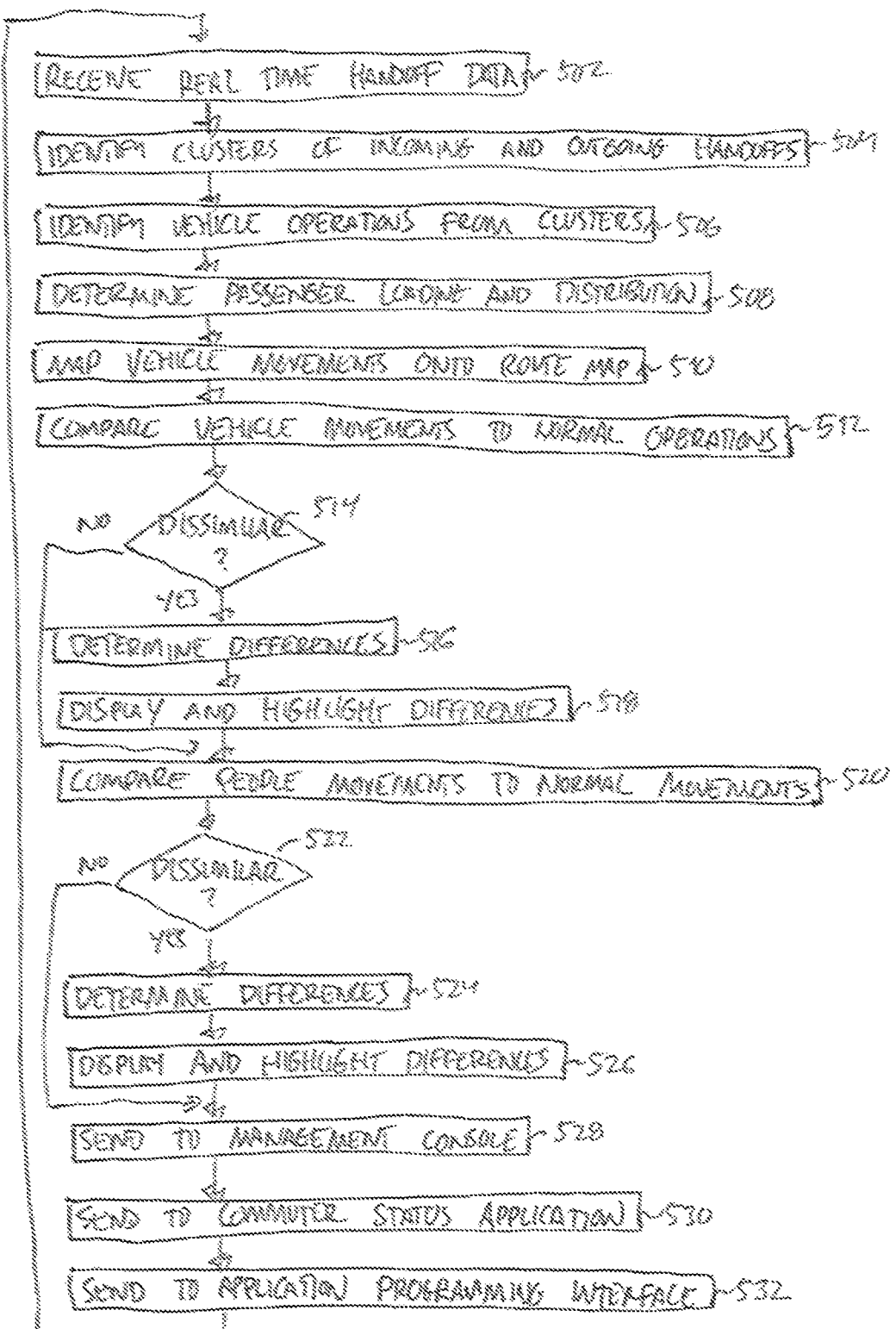
FIG. 5 is a flowchart illustration of an embodiment showing a method for analyzing real time handoff data.

FIG. 5 is a flowchart illustration of an embodiment 500 showing a method of analyzing handoff data in real time. Embodiment 500 is a simplified example of a sequence for analyzing real time data and comparing the real time data to historical data to generate alerts.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Real time handoff data may be received in block 502. A clustering analysis may identify clusters of incoming and outgoing handoffs for various locations in block 504.

Vehicle operations may be identified in block 506 by comparing the clusters in the real time data to clusters identified in the historical data. As the clusters are identified, those clusters may be tagged. The passenger loading and distribution within the vehicles may be analyzed in block 508, and vehicle movements may be mapped onto a route map in block 510.

The real time vehicle movements may be compared to historical data in block 512. If the real time movements are dissimilar to the historical data in block 514, the differences may be determined in block 516 and displayed and highlighted in block 518.

In many cases, movements of people may also be analyzed in the real time data. The movements of people may include pedestrian, bicycle, motorcycles and car movements that may be captured by incoming and outgoing handoffs to particular cellular antenna locations. The comparison to real time data and historical data may be performed in block 520.

If the real time movements are dissimilar to the historical data in block 522, the differences may be determined in block 524 and displayed and highlighted in block 526.

The results of the analysis may be sent to a traffic management console in block 528, a commuter status application in block 530, and an application programming interface in block 532.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system implemented on at least one computer processor, said system comprising:
   input comprising handoff information from a plurality of mobile handsets, said handoff information being collected by said first cellular base station, said handoff information being metadata gathered by detecting handoffs from a first location area code to a second location area code, said handoffs being identified by said first cellular base station controlling a distributed antenna system, said distributed antenna system comprising said first location area code and said second location area code;
   said at least one computer processor configured to:
      determine that a vehicle has come within range of said first cellular base station antenna; and
      determine an estimated number of passengers on said vehicle, said estimated number of passengers being determined using said handoff information.

2. The system of claim 1, said at least one computer processor further configured to:
   determine an estimated speed for said vehicle.

3. The system of claim 1, said at least one computer processor further configured to:
   determine a distribution of passengers within said vehicle.

4. The system of claim 1, said at least one computer processor further configured to:
   generate a set of operational data for said vehicle, said operational data comprising an arrival time; and
   store said set of operational data.

5. The system of claim 4, said at least one computer processor further configured to:
   compare said set of operational data to a historical set of operational data; and
   determine that said vehicle is one of a group composed of:
      on time;
      ahead of time; or
      late.

6. The system of claim 1, said handoff information not comprising identifier information for any of said plurality of mobile handsets.

7. The system of claim 1, said vehicle comprising one of a group composed of:
   a train;
   a subway train;
   an airplane;
   a ferry;
   a bus; and
   a car.

8. A system implemented on at least one computer processor, said system comprising:
- a plurality of fixed mounted antennas mounted along a vehicle travel path, said plurality of fixed mounted antennas connected to at least one base station, said plurality of fixed mounted antennas being part of a distributed antenna system having a controller and comprising a first location area code and a second location area code;
- for each of said fixed mounted antennas, a data collection system that:
- collects handoff information for each of a plurality of mobile handsets from said controller, said handoff information comprising a handoff time, by identifying handoffs between said first location area code and said second location area code;
- stores said handoff information with a location for said each of said fixed mounted antennas;
- an analysis system that:
- creates an operational map of said vehicle travel path, said operational map comprising a plurality of said fixed mounted antennas; and
- determines vehicle motion data by analyzing said handoff information for a plurality of said fixed mounted antennas.

9. The system of claim 8, said analysis system that:
- compares said vehicle motion data with historical vehicle motion data; and
- determines that a first fixed mounted antenna has been changed.

10. The system of claim 8, said analysis system that:
- stores said vehicle motion data in a database of historical vehicle motion data.

11. The system of claim 10, said analysis system that:
- compares said vehicle motion data to said historical vehicle motion data to generate operational data for said vehicle.

12. The system of claim 11, said operational data comprising on time data.

13. The system of claim 8, said handoff information not containing identifying information relating to said mobile handsets.

14. The system of claim 8, said vehicle motion data comprises vehicle speed.

15. The system of claim 8, said vehicle motion data comprises vehicle arrival time.

16. The system of claim 8, said vehicle motion data comprises estimated passenger load.

17. The system of claim 8, said vehicle motion data comprises estimated passenger distribution within said vehicle.

* * * * *